(12) United States Patent
Courtney et al.

(10) Patent No.: US 6,616,074 B2
(45) Date of Patent: Sep. 9, 2003

(54) BROADCAST SPREADER WITH MOVABLE DEFLECTOR

(75) Inventors: Steve P. Courtney, Powell, OH (US); John Freudenberg, Marysville, OH (US); Michael Cavins, Hilliard, OH (US)

(73) Assignee: OMS Investments, Inc., Santa Monica, CA (US)

( * ) Notice: Subject to any disclaimer, the term of this patent is extended or adjusted under 35 U.S.C. 154(b) by 0 days.

(21) Appl. No.: 09/847,462

(22) Filed: May 2, 2001

(65) Prior Publication Data
US 2002/0162907 A1 Nov. 7, 2002

(51) Int. Cl.$^7$ ................................................ A01C 17/00
(52) U.S. Cl. ....................... 239/666; 239/681; 239/685; 239/687
(58) Field of Search ................................. 239/665, 666, 239/681, 684, 685, 687, 689

(56) References Cited
U.S. PATENT DOCUMENTS

| | | | | | |
|---|---|---|---|---|---|
| 1,498,086 A | * | 6/1924 | Ford | ........................ | 239/687 |
| 2,856,191 A | * | 10/1958 | Kolb | .......................... | 239/665 |
| 4,798,325 A | * | 1/1989 | Block | .......................... | 239/156 |
| 5,340,033 A | * | 8/1994 | Whitell | ....................... | 239/661 |

* cited by examiner

Primary Examiner—Christopher Kim
(74) Attorney, Agent, or Firm—Jones Day

(57) ABSTRACT

A broadcast spreader with a movable deflector is disclosed. The spreader distributes particulate material by a rotating plate which when operating, always impacts material on the deflector. The deflector and a mounting track prevent dispensing material impacting on a user of the spreader, and when the deflector is extended, also prevent dispensing material distributing to the right side of the spreader. In this way, lawns which abut a driveway or a flowerbed may have material distributed on them without also depositing material on the driveway or flowerbed. Further, the deflector is integral with a port closure panel which automatically reduces, in a proportional manner, the flow of particulate material as the deflector is extended.

25 Claims, 7 Drawing Sheets

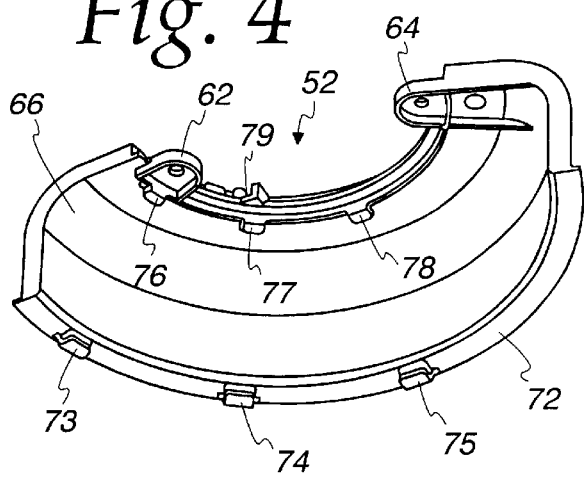
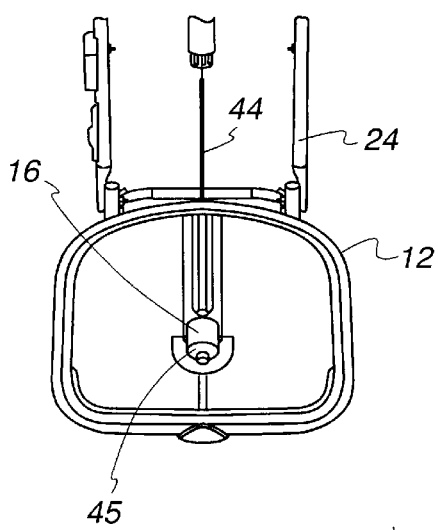
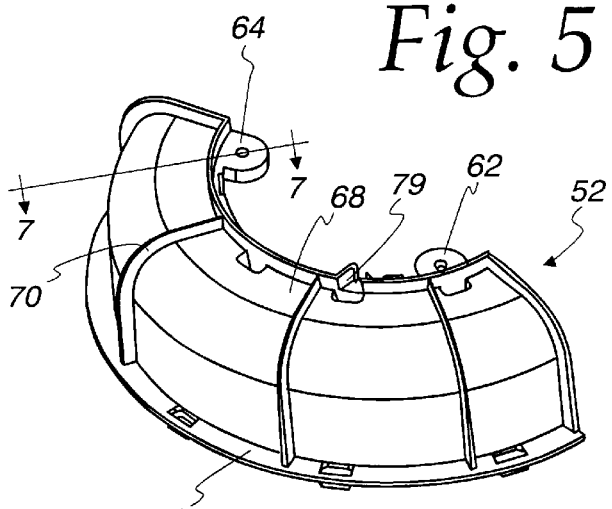
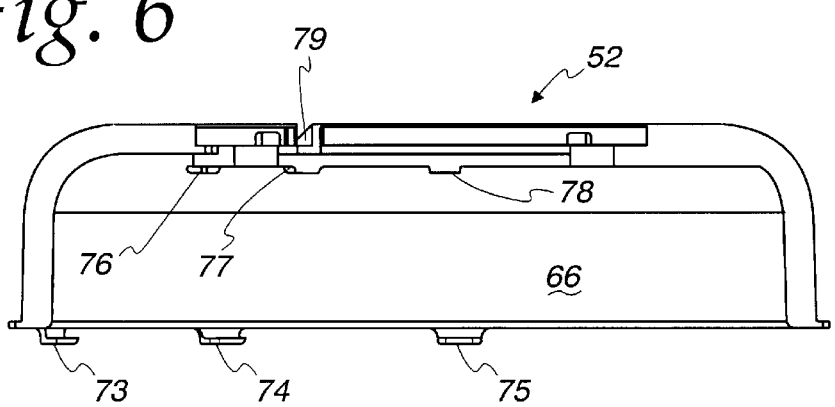

BROADCAST SPREADER WITH MOVABLE DEFLECTOR

BACKGROUND OF THE INVENTION

1. Field of the Invention

The present invention relates to a broadcast spreader and more particularly to a broadcast spreader having a simple and reliable movable deflector.

2. Description of the Related Art

Rotary broadcast spreaders are well known in the art. For example, reference is made to U.S. Pat. Nos. 1,769,302; 1,998,966; 2,287,080; 2,474,064; 2,537,916; 2,687,892; 2,955,828; 2,958,530; 2,989,314; 3,085,807; 3,094,333; 3,109,657; 3,157,402; 3,226,461; 3,411,719; 3,478,970; 3,576,262; 3,682,395; 4,272,028; 4,367,848; 4,492,341; 4,511,090; 4,580,730; 4,597,531; 5,123,598; and 5,203,510. U.S. Pat. Nos. 4,580,730 and 4,597,531, in particular, are incorporated herein by reference. An impeller broadcast spreader includes a hopper which receives material to be dispensed, such as particulate or granular materials like fertilizer, pesticides and seeds. The hopper is mounted to a pair of wheels, and a gearset is mounted to an axle between the wheels. The gearset rotates when the wheels are rotated. This causes the impeller to rotate which in turn causes the dispensing particulate matter to be distributed. Generally the dispensed material is spread about five feet to the left and to the right of the centerline of the hopper. Controls are provided to meter the dispensed material and a deflector may be present with its own control, such as shown in U.S. Pat. No. 4,511,090.

A problem that has been bothering the industry is the handling of dispensed material when there is a sharp divide between different areas of a yard. For example, grass may be immediately adjacent a flowerbed or a driveway. In these situations when there is a need to seed or fertilize the lawn area, but not have the seed land on the driveway where it will do no good or in the flowerbed where it is not wanted, adjusting the pattern of distribution is difficult. Another problem relates to the dispensing of certain material. It is desired that control products, such as herbicides and pesticides, be restricted only to the area intended and not where it may do damage.

BRIEF SUMMARY OF THE INVENTION

The difficulties encountered have been overcome by the present invention. What is described here is a spreader for broadcasting particulate material in a controlled distribution pattern comprising a container for holding material to be dispensed, a pair of wheels connected to the container for facilitating movement of the container in a direction of travel, a rotatable plate mounted to the container for receiving dispensed material from the container and for distributing the material, a mechanism for rotating the plate, a deflector connected to the container for controlling the distribution of the material, the deflector being movable about the plate, a track attached to the container for supporting the deflector, a port disposed between the container and the plate for passing dispensed material and a port closure element connected to and movable with the deflector for selectively blocking the port.

There are a number of advantages, features and objects achieved with the present invention which are believed not to be available in earlier related devices. For example, one advantage is that the present invention provides a control of the pattern of dispensing material from a yard spreader. Another object of the present invention is to provide a broadcast spreader having a dispensing control mechanism which is simple, reliable and economical. A further advantage of the present invention is that the dispensing control mechanism is easy to operate. Another feature of the present invention is that undesirable dispensed material is blocked from striking a user pushing the spreader from behind.

A more complete understanding of the present invention and other objects, advantages and features thereof will be gained from a consideration of the following description of the preferred embodiment read in conjunction with the accompanying drawing provided herein.

BRIEF DESCRIPTION OF THE SEVERAL VIEWS OF THE DRAWING

FIG. 3 is a plan view of the container of the spreader shown in FIGS. 1 and 2.

FIG. 4 is an upward looking isometric view of a mounting track of the present invention.

FIG. 5 is a downward looking rear isometric view of the mounting track of FIG. 4.

FIG. 6 is a front elevation view of the mounting track shown in FIGS. 4 and 5.

DETAILED DESCRIPTION OF THE INVENTION

Figure 1:
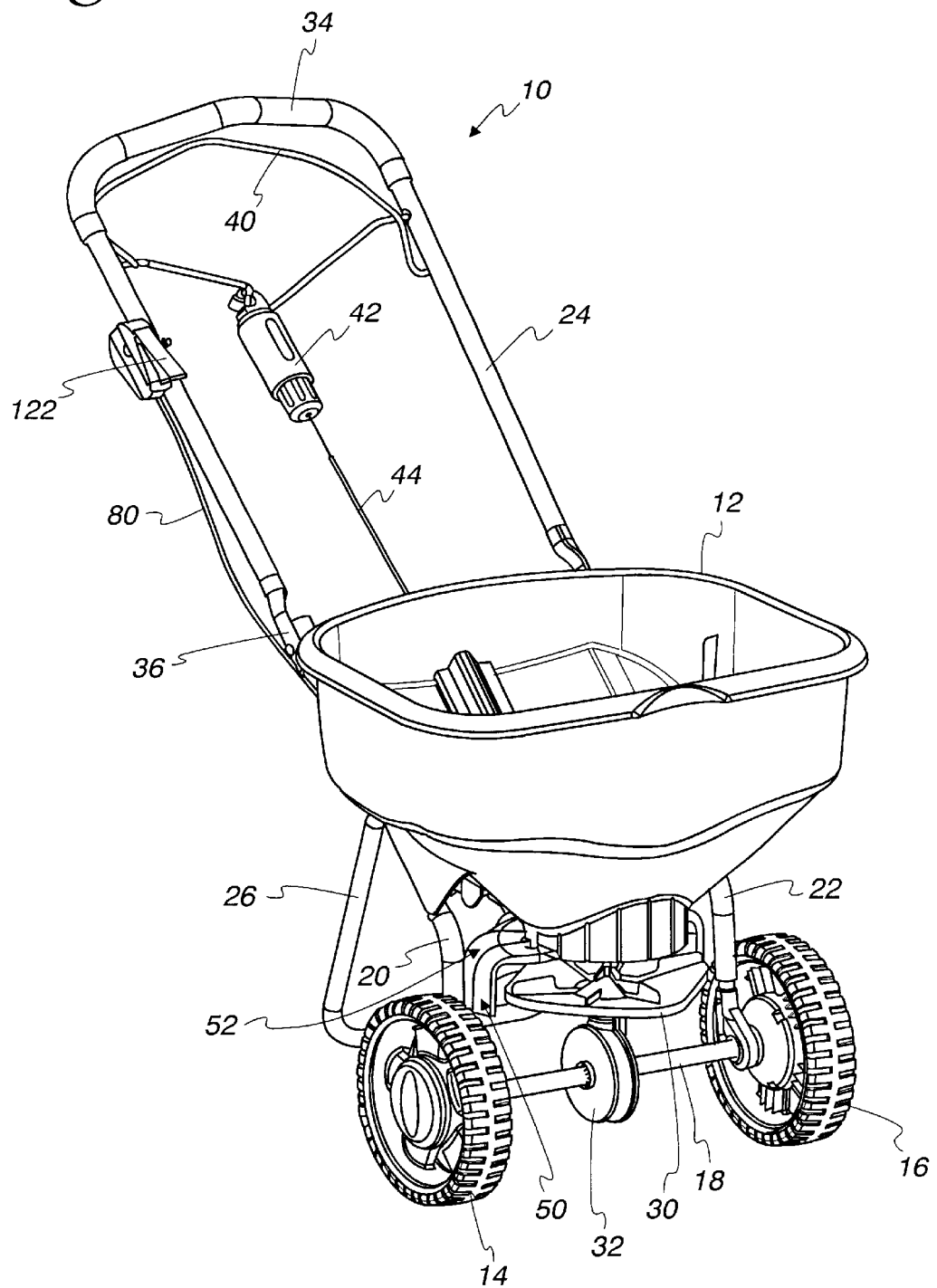
FIG. 1 is a front isometric view of the broadcast spreader of the present invention.

While the present invention is open to various modifications and alternative constructions, the preferred embodiment shown in the drawing will be described herein in detail. It is understood, however, that there is no intention to limit the invention to the particular form disclosed. On the contrary, the intention is to cover all modifications, equivalent structures and methods, and alternative constructions falling within the spirit and scope of the invention as expressed in the appended claims.

Figure 2:
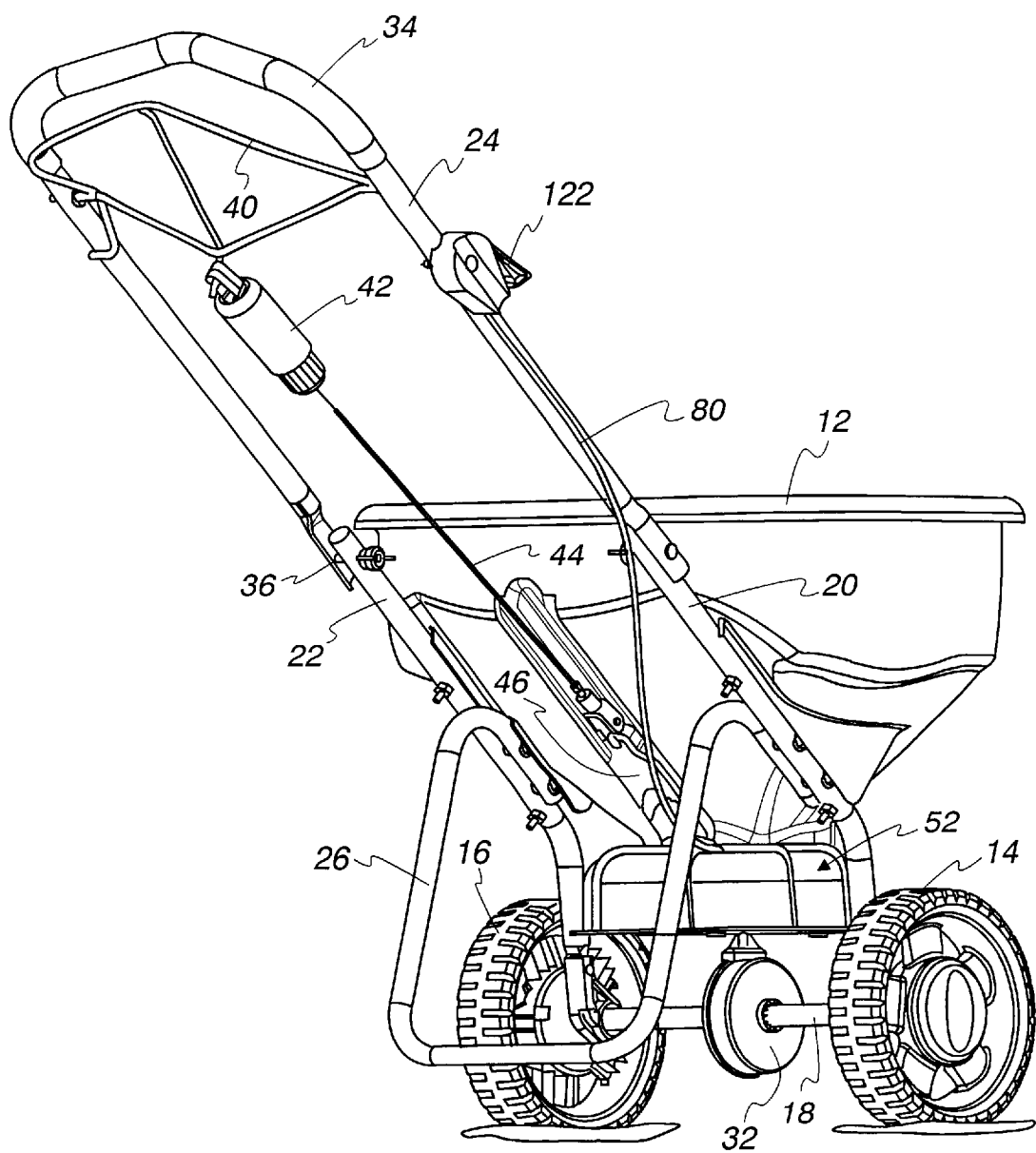
FIG. 2 is a rear isometric view of the broadcast spreader of FIG. 1.

The simplicity of the new spreader may be seen by referring first to FIGS. 1 and 2. Front and rear isometric views of a broadcast spreader 10 are illustrated. The spreader includes a container or hopper 12 into which particulate or granular material such as fertilizer, pesticides, herbicides, seed and the like are placed by a user. The hopper 12 is mounted to a pair of wheels 14, 16 which are connected by an axle 18. Connecting the hopper to the wheels and the axle are opposing tubular legs 20, 22 which are also connected to a tubular handle 24 and a tubular rest stand 26.

Located beneath the hopper 12 is a rotatable plate, rotor plate or impeller 30 which is driven by a set of gears within a gearbox 32. The upper portion of the tubular handle may include a foam grip 34, and the spreader may be foldable at a junction 36 to allow storage and shipping in a compact configuration. A hopper closure assembly including a closure lever 40, an adjustment micrometer 42, a control wire 44 and a slidable closure plate 46 are provided to allow an operator to meter the amount of material which leaves the hopper. The hopper has an opening 45, FIG. 3, at its lowest elevation through which the dispensing material leaves the hopper. The closure plate 46 is mounted to the hopper to block or unblock the opening 45 depending upon whether the spreader is in use. When in use, an operator may manipulate the micrometer to adjust the degree to which the opening is unblocked. If larger particulate matter is being dispensed, the closure plate may block less of the opening. If fine material is being dispensed, more of the opening may be blocked. The position of the closure plate is controlled by the lever 40 and the micrometer 42 and the decisions of the user are transmitted by the wire 44 to the closure plate. Disposed just upstream of the impeller 30 are a deflector 50 and a track 52 to which the deflector is mounted in a rotatable relationship.

Figure 7:
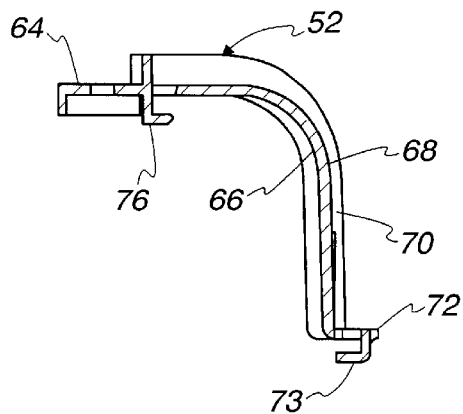
FIG. 7 is an enlarged sectional view taken along line 7—7 of FIG. 5.

The deflector and track are simple, reliable and economical as reference to FIGS. 4–7 and then 8–10 will show. In FIGS. 4–7, there is illustrated the integral one piece molded mounting track 52 having two attachment tabs 62, 64. Each tab has a hole for receiving a fastener for connection to the hopper 12. The mounting track has an arcuate shape extending approximately one hundred and fifty five degrees and a smooth inner surface 66. An outer surface 68 is reinforced by several ribs such as the rib 70. The mounting track has a generally smoothly curved upsidedown L-shaped cross section as illustrated in FIG. 7. A flange 72 extends from a lower edge. Depending fingers 73, 74, 75 are provided at spaced intervals along the flange 72 to receive and support a mating flange on the deflector as will be explained hereinbelow. A similar series of fingers 76, 77, 78 are located at the upper edge of the mounting track for the purpose of receiving and supporting another flange of the deflector as will also be explained hereinbelow. A channel shaped passage 79 is formed in the upper portion of the mounting track for accommodating a deflector operating link or cable 80, FIGS. 1 and 2.

Figure 8:
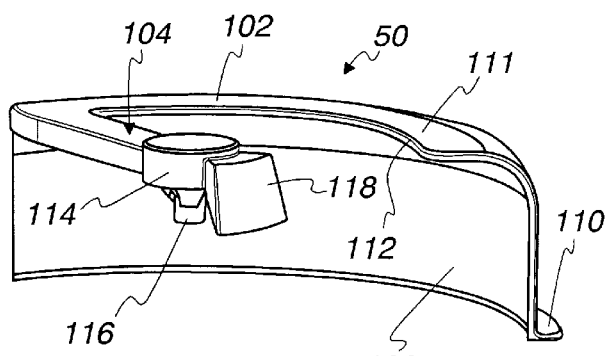
FIG. 8 is a front isometric view of a deflector of the present invention.
Figure 9:
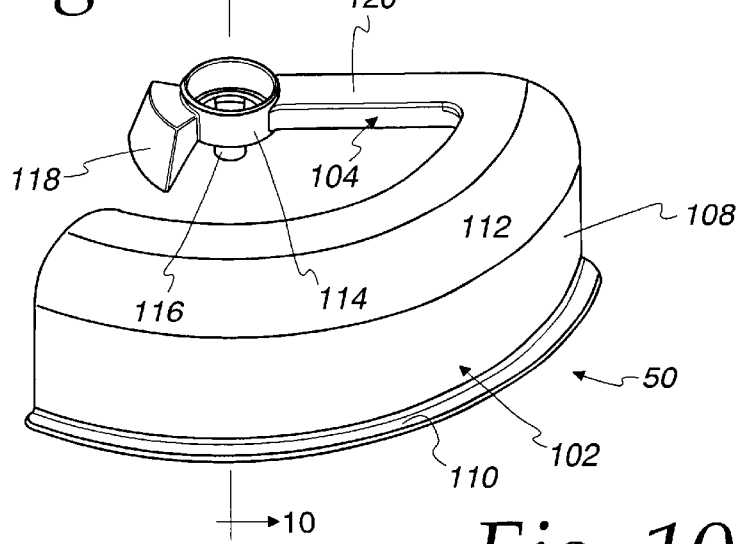
FIG. 9 is a downward looking rear isometric view of the deflector shown in FIG. 8.
Figure 10:
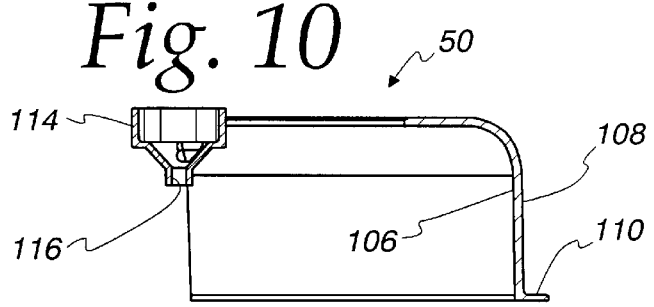
FIG. 10 is a sectional view taken along line 10—10 of FIG. 9.

Referring now to FIGS. 8–10, the deflector 50 is illustrated in detail. The deflector has two portions, an arcuate shaped portion 102 and a radially extending arm portion 104. The arcuate shaped portion 102 extends for approximately one hundred and twenty five degrees and includes a generally smoothly curved, upsidedown L-shaped cross section as shown in FIGS. 8 and 10. The deflector has a smooth interior surface 106 and a similarly smooth exterior surface 108 which is to nest adjacent the inner surface 66 of the track 52. A lower flange 110 is integral with the arcuate portion. An upper region 111 of the arcuate portion adjacent an upper edge 112 is formed like a flange to be received by the upper fingers 76, 77, 78 of the mounting track, FIG. 4. The lower flange 110 of the deflector is adapted to be received by the lower fingers 73, 74, 75 on the mounting track. In this way the deflector may be engaged with the mounting track and supported thereby.

Figure 11:
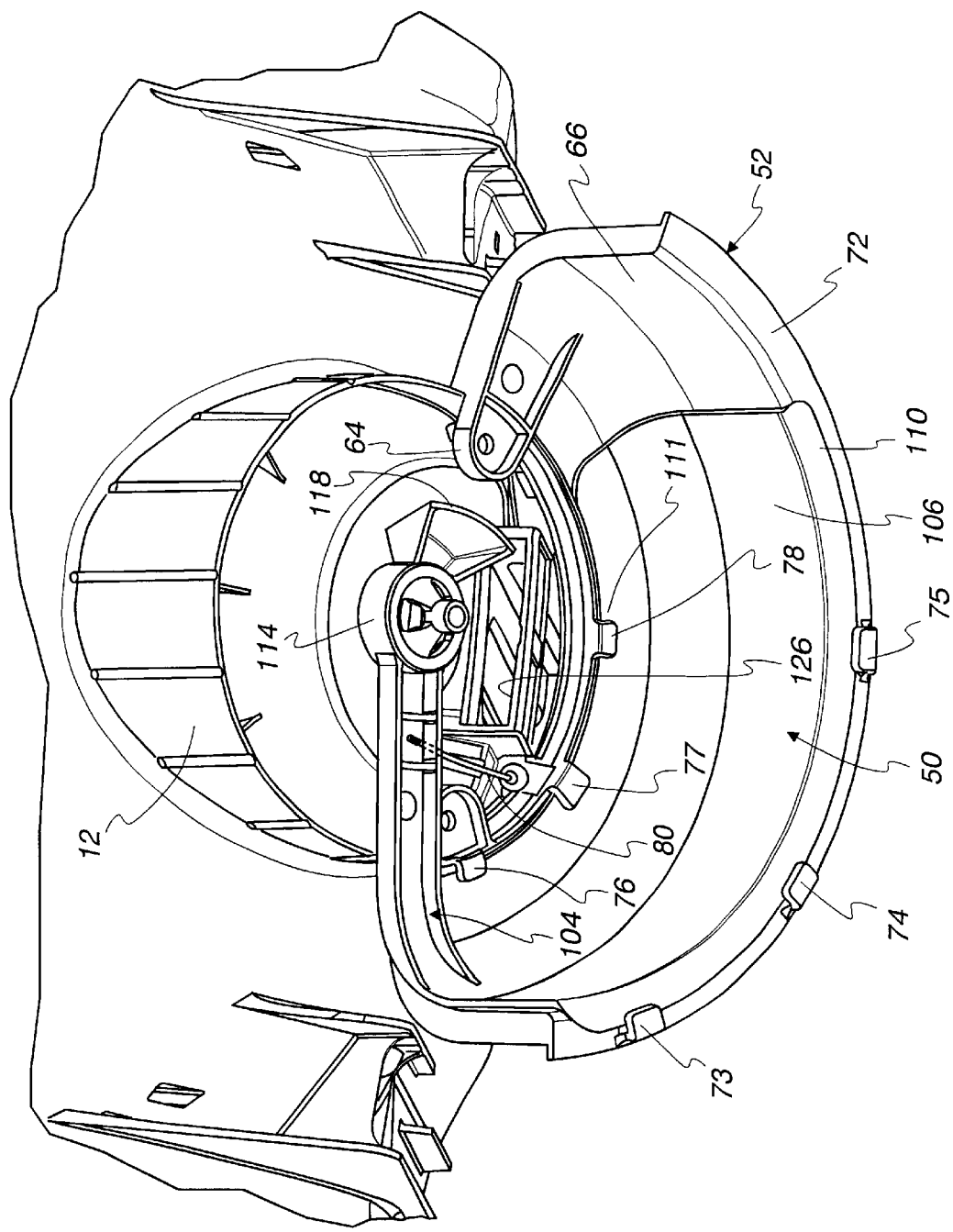
FIG. 11 is an upward looking isometric view of the deflector and track attached to the bottom of the container and showing the deflector in a retracted position.
Figure 12:
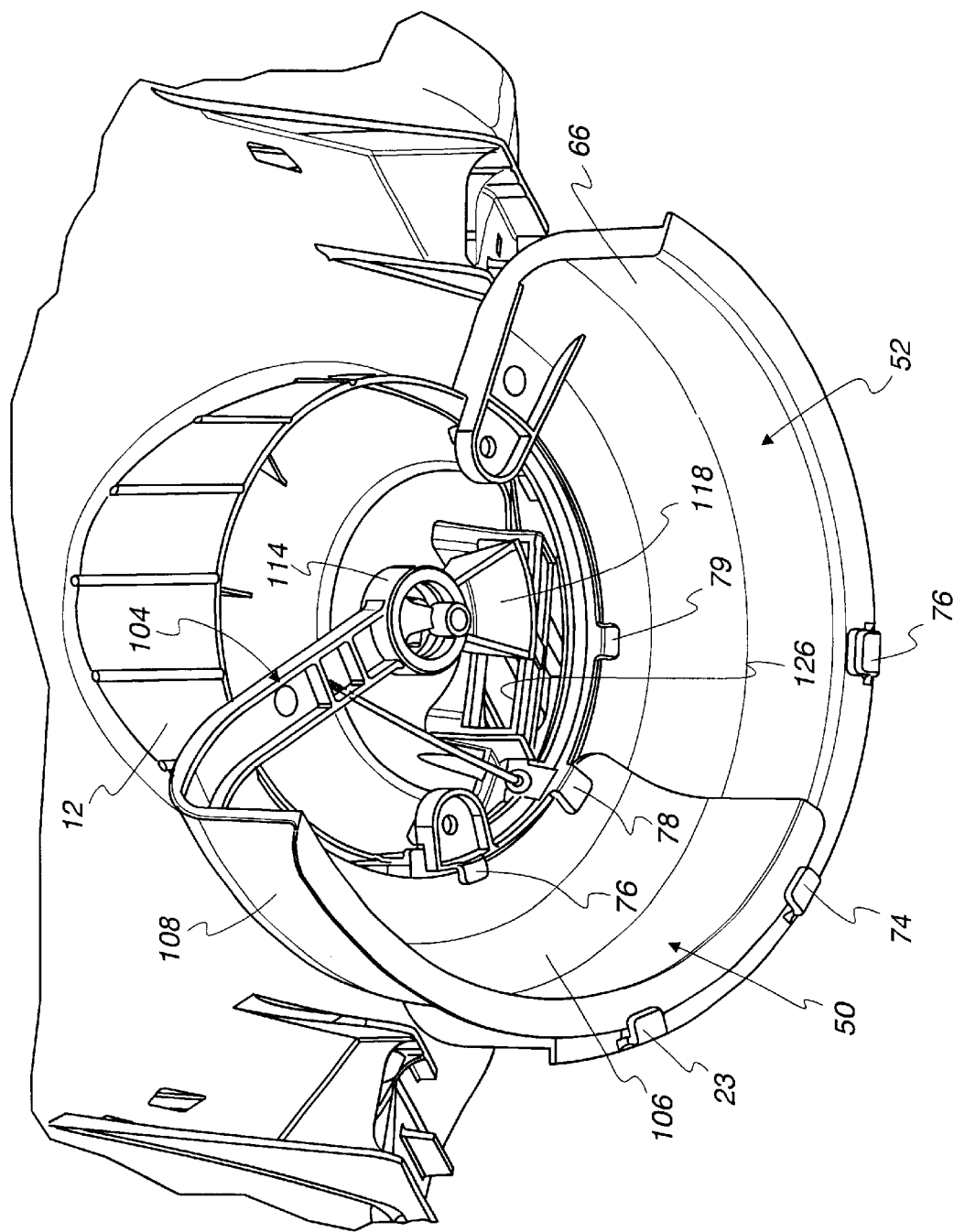
FIG. 12 is an upward looking isometric view of the deflector and track mounted to the bottom of the container and showing the deflector in an extended position.
Figure 13:
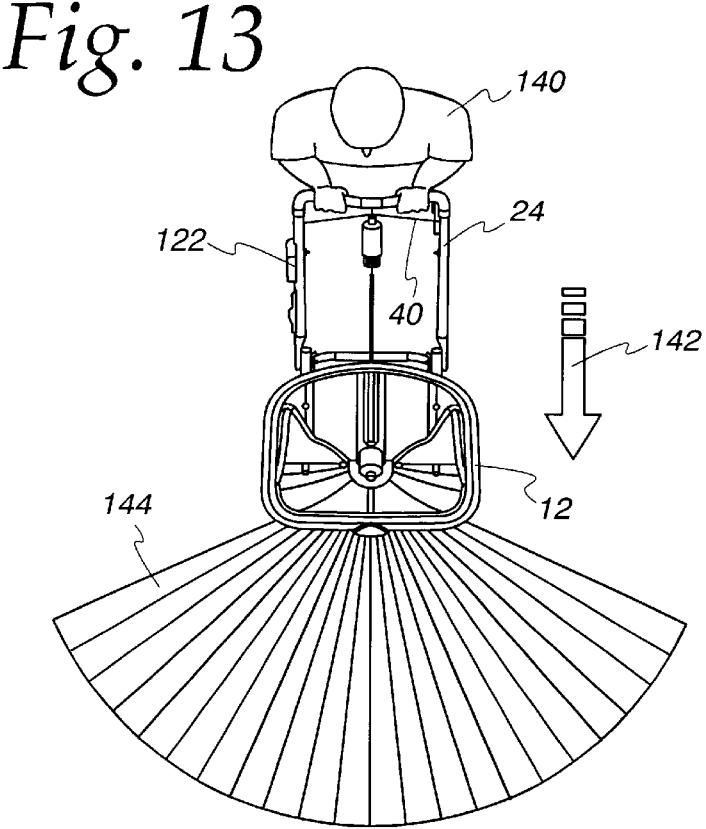
FIG. 13 is a diagrammatic plan view illustrating a spread pattern with the deflector retracted.
Figure 14:
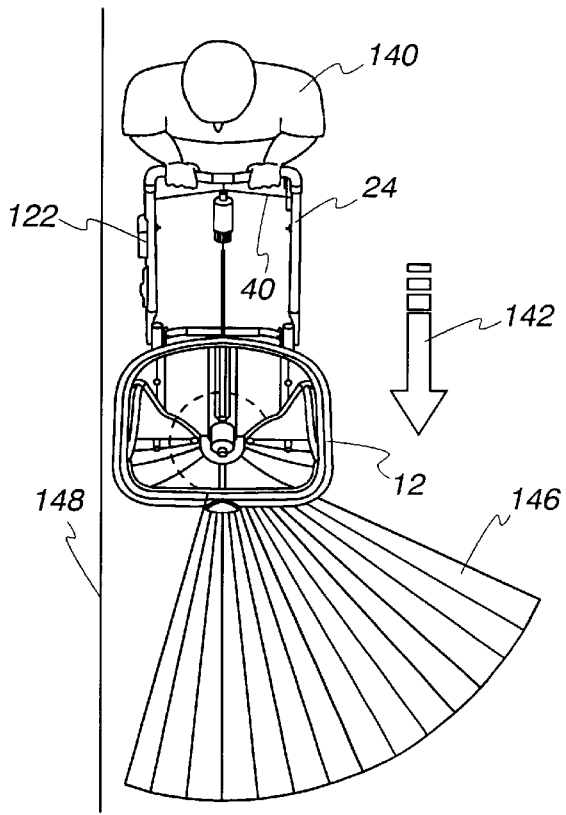
FIG. 14 is a diagrammatic plan view illustrating a spread pattern with the deflector extended.

The deflector may be rotated between a retracted position as shown in FIG. 11 and a fully extended position as shown in FIG. 12. The shape of the deflector matches that of the mounting track although the deflector extends for about one hundred and twenty five degrees. One can now appreciate that whether the deflector is in the retracted position or in the fully extended position or in any position in between, some dispensing material flowing from the hopper unto the rotating plate will impact the deflector. When the deflector is retracted, it and the track protect a user pushing the spreader from the dispensing material. When the deflector is fully extended, the mounting track is mostly exposed to block any particulate matter being distributed from hitting the user of the spreader. When the deflector is fully extended particulate material is also prevented from being distributed to the right of the spreader as will be explained. When retracted the combined track and deflector extend about one hundred and fifty-five degrees. When the deflector is extended the combined track and deflector extend about two hundred and twenty degrees.

The radially extending arm portion 104 extends from the leading end of the arcuate shaped portion 106 and includes a circular rim 114 and a bearing ring 116 that mates with a center post of the rotatable plate 30. Extending beyond the circular rim is a projecting closure panel 118. This panel acts as a valve for partially blocking a port through which the dispensing material flows when the spreader is operating and the closure plate 46 unblocks the hopper opening 45. When the deflector is rotated relative to the mounting track, the blocking panel 118 also rotates and moves relative to the port for partially blocking the port to reduce the flow of dispensing material.

It should be noted that while the deflector rotated about the axis of rotation of the rotor plate in a generally horizontal plane, the deflector is offset slightly, about 0.030 inches, so that a lesser movement of a control lever is able to set the deflector's disposition. Also, forming the deflector as a molded, integral piece, means that only one operating lever is needed since the arcuate portion of the deflector and the arm portion with the closure panel move as one element. To facilitate movement of the deflector a hole 120 is formed in the radially extending arm portion 104. The cable 80 leading to a control lever 122, FIGS. 1 and 2, may be connected to the arm portion through the hole.

Referring now to FIGS. 11 and 12, the deflector is shown mounted to the underside of the hopper. There is also shown a port 126 which is disposed just downstream of the opening 45 in the hopper. In FIG. 11, the deflector 50 is shown attached to the mounting track 52. The upper region 111 of the deflector is engaged by the fingers 76, 77, 78 of the mounting track, and the flange 110 is engaged with the fingers 73, 74, 75. There is a substantial arcuate overlap of the deflector with the mounting track. In this position, the port 126 is fully open or fully unblocked by the closure panel 118. During operation, a full spread will be dispensed with only the rearward distribution of material being blocked by the deflector and to a smaller extent by that portion of the mounting track not covered by the deflector. It is noted that when the spreader is in operation, the deflector will always be impacted by the dispensing material whether in the retracted or in the extended position. A feature of the spreader is now apparent. None of the dispensed material will hit the user who will be located rearward of the spreader. This keeps the user clean and prevents undesirable material from landing on the user's clothes or shoes.

Referring to FIG. 12, the deflector 50 is shown in its fully extended position. Much more of the mounting track is now exposed and the region to the right side of the rotor plate is blocked. This prevents rightward distribution. If there is a driveway or flowerbed to the right of a lawn, the lawn may be provided with a distributed material but not the flowerbed or the driveway. While the deflector is illustrated fully extended in FIG. 12, a user may limit the extension of the deflector to any one of an infinite number of positions between the retracted position of FIG. 11 and the extended position of FIG. 12. This provides for close control of the distribution pattern of the material.

It is again noted that regardless of the position of the deflector, it will be impacted by dispensed material when the spreader is operating. Also the user will always be protected from rearward projecting dispensed material. Both of these features are advantages of the present invention. It is further noted that because of the slight offset of the deflector, it will still rotate in a generally horizontal plane but it will move slightly outwardly and forwardly. Essentially, there is no vertical movement which may expose the region to the rear of the rotor plate to dispensing material as is the case with some older spreaders.

Again referring to FIGS. 11 and 12, it is noted that when the deflector is in a retracted position (FIG. 11), the closure panel 118 is in an unblocked position so that the full quantity of material will be dispensed through the port 126. However, when the deflector is deployed by rotation in a clockwise direction toward the extended position (FIG. 12), the closure panel also rotates clockwise to partially cover the port. (The view to determine rotational direction is made from under the hopper, looking upwardly.) The closure panel 118 will progressively block more and more of the port 126 as the deflector is extended resulting in a progressive reduction of the flow of material from the hopper. With the deflector extended, less ground is covered by the dispensed material. Hence, it is highly desirable to reduce the total amount of material dispensed so as to avoid "ridging" or the over-concentration of dispensed material.

The linkage mechanism for controlling the deflector includes the cable 80 attached to the deflector arm portion 104 after passing through the passage 79 in the track. The cable leads to the control lever 122, mounted to the handle 24. The lever may be operated by a user's thumb to extend or retract the cable and thereby to rotate the deflector one way or the other. It is noted that the same control lever operates both the deflector and the closure panel.

In operation, a user 140, FIGS. 13, 14, fills the hopper 12 and sets the micrometer. The user sets the location of the deflector, pushes on the closure lever 40 and moves forward (in the direction of the arrow 142) by pushing on the handle 24. When the deflector is fully retracted, the spread of material is fan shaped 144, FIG. 13, extending about one hundred and thirty degrees. When the deflector is fully extended, the distribution is a partial fan shape 146 as shown in FIG. 14 and extending about eighty degrees. By adjusting the lever 122, the "fan shape" distribution may be contracted as desired. Hence, if a driveway edge 148 is to the right of the user (when facing in the direction of travel) he/she can move the deflector to cause the distribution pattern to cease at the driveway edge in a line nearly identical to the line traversed by the right wheel of the spreader. Not only is the distribution pattern closely controlled but concentrations of the material to be spread are also controlled, automatically, because the placement of the deflector 50 also determines the degree to which the port 126 is blocked by the closure panel 118. The greater the spread pattern, the more material is dispensed; with a smaller pattern, less material is dispensed.

The full spread pattern shown in FIG. 13 is an elongated strip extending as far as the user walks and having a width identical to the width of the fan 144, in practice, about ten feet. The head of the strip will be almost a semicircle. The partial spread shown in FIG. 14 is also a strip, but a narrow one having a width equal to the width of the partial fan 146. The volume of material deposited in the wider strip will be greater than the volume of material deposited in the narrower strip because of the partial block of the port through which the material passes when flowing from the hopper to the rotor plate.

The specification describes in detail an embodiment of the present invention. Other modifications and variations will, under the doctrine of equivalents, come within the scope of the appended claims. For example, changing the dimensions of the hopper, the hopper opening, the port size, the deflector or any other element will still result in equivalent structures. Also changing the arcuate extent of the deflector and/or the mounting track are also considered equivalent structures. Still other alternatives will also be equivalent as will many new technologies. There is no desire or intention here to limit in any way the application of the doctrine of equivalents.

What is claimed is:

1. A spreader for broadcasting particulate materials in a controlled pattern of distribution comprising:

a container for holding the material to be dispensed;

means connected to said container for facilitating movement of said container in a direction of travel;

a rotatable plate mounted to said container for receiving dispensed material from said container and for distributing said material;

a mechanism for rotating said plate;

a deflector connected to said container for controlling the distribution of said material, said deflector being movable about said plate;

a track attached to said container for supporting said deflector;

a port disposed between said container and said plate for passing dispensed material; and a port closure element connected to and movable with said deflector for selectively blocking said port.

2. The spreader as claimed in claim 1 wherein:

said track blocks the dispensing of material in a direction opposite to the direction of travel of said container.

3. The spreader as claimed in claim 1 wherein:

said deflector is movable between a retracted position and a plurality of extended positions, said movement being by rotational motion in a generally horizontal plane.

4. The spreader as claimed in claim 1 wherein:

said deflector is a generally L-shaped cross section.

5. The spreader as claimed in claim 1 wherein:

said deflector includes an arcuate portion and a radially extending arm portion and is integral with said port closure element.

6. The spreader as claimed in claim 1 wherein:

said deflector is disposed to always be impacted by dispensing material upon operation of the spreader.

7. The spreader as claimed in claim 1 wherein:

said deflector has an arcuate portion having an extent of about one hundred and twenty five degrees.

8. The spreader as claimed in claim 1 wherein:

said track has an L-shaped cross section and an arcuate extent of about one hundred and fifty five degrees.

9. The spreader as claimed in claim 1 wherein:
said deflector and said track each has an arcuate shape and said deflector is movable between a retracted position and a fully extended position, said deflector and said track subscribing when the deflector is in a fully extended position an arc of about 220 degrees.

10. The spreader as claimed in claim 1 including:
a linkage mechanism for facilitating the movement of said deflector about said plate.

11. The spreader as claimed in claim 1 wherein:
said deflector is rotationally mounted about said plate, said axis of rotation of said deflector being offset from the axis of rotation of said plate.

12. The spreader as claimed in claim 2 wherein:
said deflector is movable between a retracted position and a plurality of extended positions, said movement being by rotational motion in a generally horizontal plane.

13. The spreader as claimed in claim 12 wherein:
said deflector includes an arcuate portion and a radial arm and is integral with said port closure element.

14. The spreader as claimed in claim 13 wherein:
said deflector is disposed to always be impacted by said dispensing material upon operation of the spreader.

15. The spreader as claimed in claim 14 wherein:
said deflector has an arcuate portion having an extent of about one hundred and twenty five degrees and said mounting track has an arcuate extent of about one hundred and fifty five degrees.

16. The spreader as claimed in claim 15 including:
a linkage mechanism for facilitating the movement of said deflector about said plate.

17. A spreader for broadcasting particulate materials comprising:
a container for holding material to be dispensed;
means connected to said container for facilitating movement of said container;
a rotatable plate mounted to said container for receiving dispensed material from said container and for distributing said material;
a mechanism for rotating said plate;
a movable deflector connected to said container for controlling the pattern of distribution of said material, said deflector being movable about said plate;
a mounting track attached to said container for supporting said deflector, said mounting track having an inner surface; and
said deflector being movable between a refracted position and a plurality of extended positions, said movement of said deflector being by rotational motion in a generally horizontal plane;
a port disposed between said container and said plate for passing dispensed material; and
a port closure element connected to and movable with said deflector for selectively blocking said port.

18. The spreader as claimed in claim 17 wherein:
said deflector includes an arcuate portion and a radially extending arm and is integral with said port closure element.

19. A spreader for broadcasting particulate materials comprising:
a container for holding material to be dispensed;
means connected to said container for facilitating movement of said container;
a rotatable plate mounted to said container for receiving dispensed material from said container and for distributing said material;
a mechanism for rotating said plate;
a movable deflector connected to said container for controlling the pattern of distribution of said material, said deflector being movable about said plate; and
a mounting track attached to said container for supporting said deflector, said mounting track having an inner surface; wherein:
said deflector is structured to nest adjacent said inner surface of said mounting track and being movable between a retracted position and a plurality of extended positions, said movement of said deflector being by rotational motion in a generally horizontal plane,
said deflector and said mounting truck both have generally L-shaped cross sections;
said deflector extends about one hundred and twenty five degrees; and
said track extends about one hundred fifty five degrees.

20. A spreader for broadcasting particulate materials comprising:
a container for holding material to be dispensed;
means connected to said container for facilitating movement of said container in a direction of travel;
a rotatable plate mounted to said container for receiving dispensed materials from said container and for distributing said material;
a mechanism for rotating said plate;
a deflector connected to said container for controlling the pattern of distribution of said material, said deflector being movable about said plate;
a mounting track having an arcuate shape in top plan view attached to said container for supporting said deflector, said deflector spreading said material in a pattern having a generally straight edge parallel to the direction of travel of said container and adjacent a side of said container;
a port disposed between said container and said plate for passing dispensed material; and
a port closure element connected and movable with said deflector for selectively blocking said port.

21. The spreader as claimed in claim 20 wherein:
said deflector includes an arcuate portion and a radially extending arm and is integral with said port closure element.

22. The spreader as claimed in claim 21 wherein:
said deflector and said mounting track each have an arcuate shape and said deflector is movable between a retracted position and a fully extended position, said deflector and said mounting track subscribing when said deflector is in a fully extended position an arc of about two hundred and twenty degrees.

23. A spreader for broadcasting particulate materials comprising:
a container for holding material to be dispensed;
means connected to said container for facilitating movement of said container in a direction of travel;
a rotatable plate mounted to said container for receiving dispensed materials from said container and for distributing said material;
a mechanism for rotating said plate;
a movable deflector connected to said container for controlling the pattern of distribution of said material, said deflector being movable about said plate;

a mounting track having an arcuate shape attached to said container for supporting said deflector for blocking the distribution of material in a direction opposite to the direction of travel of said container;

a port disposed between said container and said plate for passing dispensed material; and a port closure element connected and movable with said deflector for selectively blocking said port.

24. The spreader as claimed in claim 23 wherein:

said deflector includes an arcuate portion and a radially extending arm and is integral with said port closure element.

25. The spreader as claimed in claim 24 wherein:

said deflector has a generally L-shaped cross section;

said mounting track has a generally L-shaped cross section;

said deflector has an arcuate portion extending about one hundred twenty five degrees; and said mounting track has an arcuate extent of about one hundred and fifty five degrees.

* * * * *

UNITED STATES PATENT AND TRADEMARK OFFICE
CERTIFICATE OF CORRECTION

PATENT NO. : 6,616,074 B2
DATED : September 9, 2003
INVENTOR(S) : Steve P. Courtney et al.

It is certified that error appears in the above-identified patent and that said Letters Patent is hereby corrected as shown below:

Column 6,
Line 53, change "is" to -- has --.

Column 7,
Line 50, change "refracted" to -- retracted --.

Column 9,
Line 2, insert -- and -- between "deflector" and "for".

Signed and Sealed this

Sixteenth Day of December, 2003

JAMES E. ROGAN
*Director of the United States Patent and Trademark Office*